Patented Mar. 19, 1940

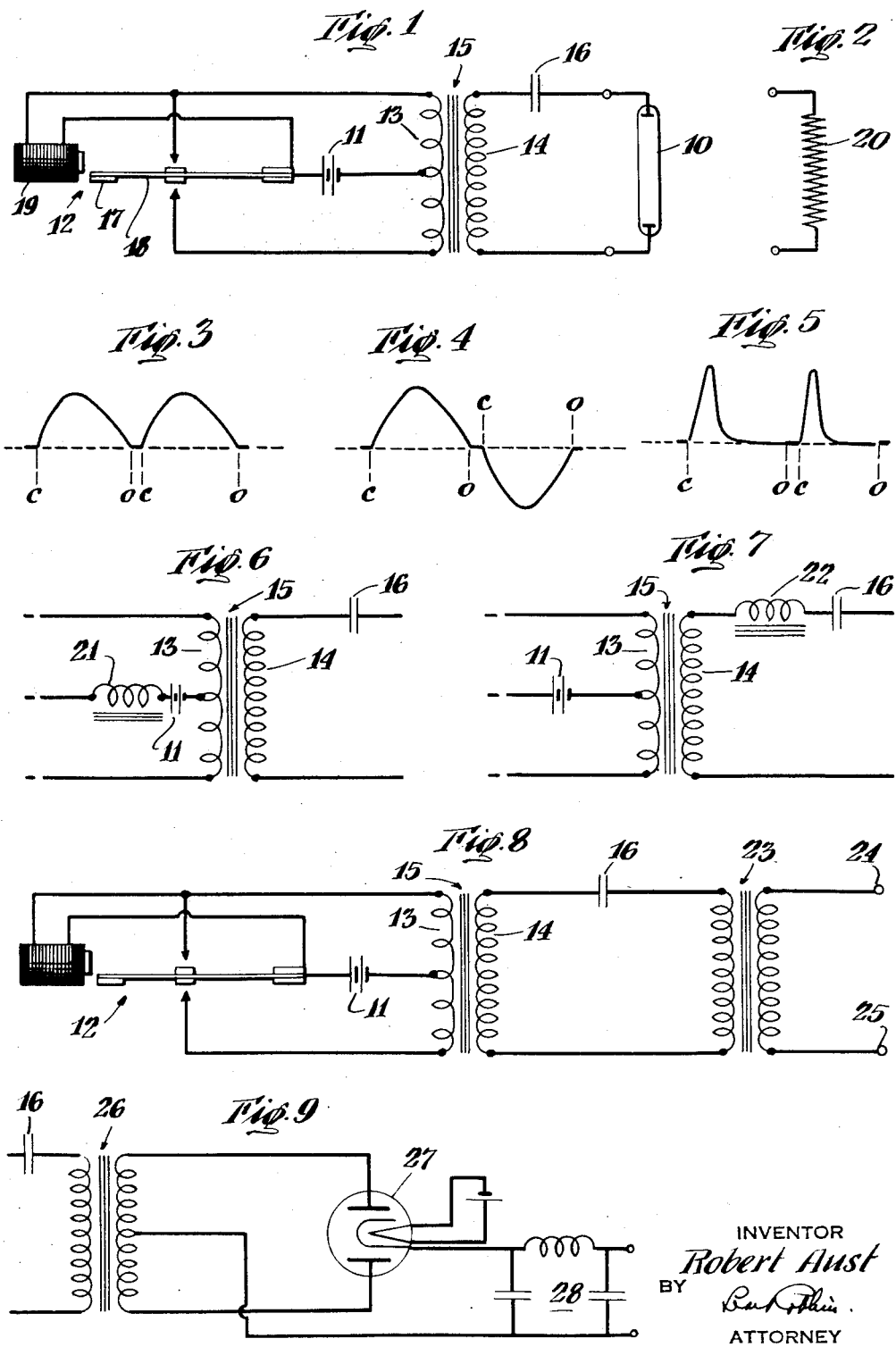

2,194,288

UNITED STATES PATENT OFFICE 2,194,288

POWER SUPPLY SYSTEM

Robert J. Aust, Indianapolis, Ind., assignor to P. R. Mallory & Co., Inc., Indianapolis, Ind., a corporation of Delaware Application February 17, 1938, Serial No. 190,970

9 Claims. (Cl. 175—36.5)

This invention relates to electric power supply systems and particularly to systems of the type using vibratory interrupter devices and transformers.

An object of the invention is to improve such systems.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a circuit diagram of a power supply system embodying features of my invention;

Figure 2 represents diagrammatically an alternative form of load which may be supplied with power by the system;

Figures 3, 4 and 5 are graphic representations of the current fluctuations in certain parts of the system;

Figures 6 and 7 illustrate modifications of the system;

Figure 8 represents a further modified system; and

Figure 9 shows a variation of the system of Figure 8.

A feature of the present invention resides in the use of a capacitance in series with a secondary circuit of the power supply system, whereby, among other advantages, improved current wave form is obtained and deterioration of the interrupter contacts is reduced.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing Figure 1 shows a power supply system for energizing a gaseous tube 10. The system comprises a source of D. C. power such as a battery 11, a vibratory interrupter 12 and a transformer primary winding 13, the D. C. source and vibrator being arranged to produce D. C. pulses alternately through the upper and lower halves of the primary winding in a well known manner.

Transformer secondary winding 14 is inductively associated with primary 13, the windings thereby constituting a step-up transformer 15. The gaseous tube load 10 is in series with secondary 14, and according to the present invention, condenser 16 is also in series with the secondary circuit.

It is also preferable, in this circuit that the primary and secondary 13 and 14 be somewhat loosely coupled so as to allow for flux leakage paths between them. This has the effect of limiting the rate of current build-up in the primary, which would otherwise be very rapid due to the charging current of condenser 16.

The capacity of condenser 16 is chosen of such value as to bring about a proper timing of the current flow in the primary circuit. The timing should preferably be such that the primary current will start to flow the instant one of the pairs of vibrator contacts close the circuit, after which the current should rise gradually to a maximum at about the middle of the closed-contact interval and then decrease gradually to zero the instant before the contacts open. The shape of the curve should preferably approximate that of half of a sine wave.

The wave form (current vs. time) of the primary current drawn from battery 11 in the circuit of Figure 1 is shown graphically in Figure 3. The contacts are closed at the instants marked c and opened at the instants marked o. The off-contact intervals are somewhat exaggerated.

Figure 4 shows the wave form of the primary current as seen from each half of the transformer primary.

Because of the zero current at the time of contact "make" "break" deleterious sparking and arcing does not occur to any extent at the contacts and the contact life is materially extended.

Heating at the contacts is reduced to a minimum not only because of the reduction in arcing but also because at the time of maximum current flow the contacts are held together with maximum pressure and hence afford the minimum resistance to current flow. That the contact pressure cycle follows a curve very similar to the current curve (Figure 3) will be apparent when it is considered that the armature weight 17 on the reed 18 of vibrator 12 swings to the end of its stroke and returns almost to mid-position during each closed-contact interval. It then swings on through mid-position, opening one pair of contacts and closing the other pair. The oscillations of the reed are being maintained by the alternate intermittent energization and short circuiting of vibrator electromagnet 19.

Since condenser 16 is in the high-voltage secondary circuit it can be of relatively small capacitance, a paper electrostatic condenser being suitable.

Instead of gaseous tube 10, a resistive load 20 (Figure 2) may be supplied with power from the circuit of Figure 1. In this case likewise it is preferred to provide a flux leakage path between the primary and secondary windings 13 and 14. The capacitance of condenser 16 and the leakage inductance are so chosen as to give zero current at the instants of contact "make" and "break". In this instance the reflected secondary impedance is capacitative. The primary battery current wave form will be substantially the same as shown in Figure 3. The voltage developed across resistance 20 will be nearly sinusoidal.

If the flux leakage paths in the transformer 15 were to be omitted and a close-coupled transformer used the primary battery current would have a peaked wave form as shown in Figure 5 due to the tendency to charge the condenser rapidly at the instant the contacts close.

The desired wave form of Figure 3 may be obtained with a close-coupled transformer, if an inductance 21 is connected in series with battery 11 in the primary circuit as shown in Figure 6, or an inductance 22 is placed in series with condenser 16 as shown in Figure 7, or both.

The invention may be used in connection with all kinds of gaseous tube lighting systems or signs, with various resistance type loads and as a source of biasing potential for vacuum tube circuits, such as in the "B" supply systems for automobile radio sets.

In many instances the system may be connected to the load as illustrated in Figure 1 but frequently it may be more suitable to use an additional transformer to adapt the system to the load, as shown in Figures 8 and 9.

In Figure 8 the transformer 23 is energized from the secondary circuit of transformer 15 through condenser 16. Transformer 23 may be made of any desired characteristics as, for example, that of a standard neon tube transformer in which case the neon or gaseous tube load is connected across output terminals 24 and 25. Transformer 23 may have flux leakage paths, if desired.

Figure 9 shows a transformer 26 with center-tapped secondary which may take the place of transformer 23 of Figure 8. In this case the output may be connected through a rectifier tube 27 and filter circuit 28 to provide a smooth D. C. output suitable for radio "B" supply and the like.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A vibrator operated power supply system comprising a source of D. C. power, a transformer primary winding and an interrupter adapted to supply pulsating current to said winding from said source, a transformer secondary winding in inductive relation with said primary winding, a load fed thereby and a condenser in series with said secondary winding and load, said condenser comprising a timing capacitance adapted to reduce the primary current to zero at the instant the interrupter contacts open.

2. A vibrator operated power supply system comprising a source of D. C. power, a transformer primary winding and an interrupter adapted to supply pulsating current to said winding from said source, a transformer secondary winding in inductive relation with said primary winding, a load fed thereby and a condenser in series with said secondary winding and load and a limiting inductance in series with one of said windings, said condenser comprising a timing capacitance adapted to reduce the primary current to zero at the instant the interrupter contacts open.

3. A vibrator operated power supply system comprising a source of D. C. power, a transformer of the type having a primary and secondary winding in inductive relation and having a flux leakage path between said windings, an interrupter adapted to supply pulsating current to said primary winding from said source, a load fed by said secondary winding and a condenser in series with said secondary winding and load.

4. A vibrator operated power supply system comprising a source of D. C. power, a transformer of the type having a primary and secondary winding in inductive relation and having a flux leakage path between said windings, an interrupter adapted to supply pulsating current to said primary winding from said source, a load fed by said secondary winding and a condenser in series with said secondary winding and load, said condenser comprising a timing capacitance adapted to reduce the primary current to zero at the instant the interrupter contacts open.

5. A vibrator operated power supply system comprising a source of D. C. power, a center-tapped transformer primary winding and a vibrator connecting said source alternately to the ends of said winding to supply current in alternate pulses to the two halves of said winding from said source, a transformer secondary winding in inductive relation with said primary winding, a load fed thereby and a condenser in series with said secondary winding and load, said condenser comprising a timing capacitance to reduce the primary current to zero at the instant the vibrator contacts open.

6. A vibrator operated power supply system comprising a source of D. C. power, a transformer primary winding and an interrupter adapted to supply pulsating current to said winding from said source, a transformer secondary winding in inductive relation with said primary winding, a gaseous discharge tube fed thereby and a condenser in series with said secondary winding and tube, said condenser comprising a timing capacitance adapted to reduce the primary current to zero at the instant the interrupter contacts open.

7. A vibrator operated power supply system comprising a source of D. C. power, center tapped transformer primary winding and a vibrator connecting said source alternately to the ends of said winding to supply current in alternate pulses to the two halves of said winding from said source, a transofrmer secondary winding in inductive relation with said primary winding, a gaseous discharge tube fed thereby and a condenser in series with said secondary winding and tube, said condenser comprising a timing capacitance to reduce the primary current to zero at the time the vibrator contacts open.

8. A vibrator operated power supply system comprising a source of D. C. power, a transformer of the type having a primary and secondary winding in inductive relation and having a flux leakage path between said windings, and an interrupter adapted to supply pulsating current to said primary winding from said source, a gaseous discharge tube fed by said secondary winding and a condenser in series with said secondary winding and tube.

9. A vibrator operated power supply system comprising a source of D. C. power, a transformer of the type having a primary and secondary winding in inductive relation and having a flux leakage path between said windings, said primary winding having a center tap, a vibrator connecting said source alternately to the ends of said primary winding to supply current in alternate pulses to the two halves of said winding from said source, a gaseous discharge tube fed thereby and a condenser in series with said secondary winding and tube, said condenser comprising a timing capacitance to improve the primary current wave form and thereby protect the vibrator contacts.

ROBERT J. AUST.